(12) United States Patent
Zensai

(10) Patent No.: US 7,868,971 B2
(45) Date of Patent: Jan. 11, 2011

(54) LIQUID CRYSTAL MODULE HAVING A LIGHT REFLECTING SHEET WITH A TAB PIECE INSERTED THROUGH AN OPENING OF A FRAME AT AN EDGE PORTION

(75) Inventor: Atsunori Zensai, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 329 days.

(21) Appl. No.: 12/140,396

(22) Filed: Jun. 17, 2008

(65) Prior Publication Data

US 2008/0316389 A1 Dec. 25, 2008

(30) Foreign Application Priority Data

Jun. 21, 2007 (JP) .............................. 2007-163265

(51) Int. Cl.
 G02F 1/1333 (2006.01)
 G02F 1/1335 (2006.01)
 G09F 13/04 (2006.01)
 G09F 13/08 (2006.01)
(52) U.S. Cl. .............................. 349/67; 349/58; 349/70; 362/97.2
(58) Field of Classification Search ............. 349/58–71; 362/97.1–97.4
 See application file for complete search history.

(56) References Cited

U.S. PATENT DOCUMENTS

2002/0030993 A1* 3/2002 Itoh ........................... 362/246

2004/0032725 A1* 2/2004 Hsieh et al. ................... 362/31

FOREIGN PATENT DOCUMENTS

| JP | 2000-19512 A | 1/2000 |
| JP | 2000-340017 A | 12/2000 |
| JP | 2001-91947 A | 4/2001 |
| JP | 2006-216512 A | 8/2006 |
| JP | 2007-12569 A | 1/2007 |

OTHER PUBLICATIONS

European Search Report of Corresponding European Application No. 08 01 1195.8 dated Jun. 14, 2010.

* cited by examiner

*Primary Examiner*—Mark A Robinson
*Assistant Examiner*—Paul C Lee
(74) *Attorney, Agent, or Firm*—Global IP Counselors

(57) ABSTRACT

A liquid crystal module includes a frame, a light reflecting sheet, a cold cathode tube, an optical sheet, a liquid crystal panel and a bezel. The frame has a pair of opposing edge frame parts formed on a pair of opposing side plates of the frame, respectively. At least one of the edge frame parts has an opening. The light reflecting sheet is disposed on the frame and has a pair of opposing end edge parts that is superposed on the edge frame parts of the frame, respectively. At least one of the end edge parts has a tab piece that is inserted through the opening of the at least one of the edge frame parts of the frame to engage to a lower side of the at least one of the edge frame parts.

11 Claims, 6 Drawing Sheets

LIQUID CRYSTAL MODULE HAVING A LIGHT REFLECTING SHEET WITH A TAB PIECE INSERTED THROUGH AN OPENING OF A FRAME AT AN EDGE PORTION

CROSS-REFERENCE TO RELATED APPLICATIONS

This application claims priority to Japanese Patent Application No. 2007-163265 filed on Jun. 21, 2007. The entire disclosure of Japanese Patent Application No. 2007-163265 is hereby incorporated herein by reference.

BACKGROUND OF THE INVENTION

1. Field of the Invention

The present invention generally relates to a liquid crystal module. More specifically, the present invention relates to a liquid crystal module having a light reflecting sheet.

2. Background Information

A conventional direct backlight type of liquid crystal module has a frame, a light reflecting sheet, a cold cathode tube, an optical sheet, a liquid crystal panel and a bezel. The light reflecting sheet is provided in an interior of the frame. The cold cathode tube, the optical sheet and the liquid crystal panel are disposed above the light reflecting sheet. The bezel is installed from above to hold down a peripheral edge of the liquid crystal panel. With the liquid crystal module, a plurality of protrusions is formed on edge frame parts of the frame. The light reflecting sheet is positioned by fitting the protrusions into holes formed in end edge parts of the light reflecting sheet.

With another conventional liquid crystal module, a first prong part protruding from one short side of an optical sheet is fixed to a frame. A second prong part protruding from the other short side is fitted into a recess in the frame. A positioning protrusion formed on a bottom face of the recess is inserted in a slot formed in the second prong part. This allows relative displacement between the frame and the second prong part (see Japanese Laid-Open Patent Application Publication No. 2001-91947, for example).

With a conventional lighting device for a liquid crystal display device, a cut-out is provided to a side face of a frame that houses a light guide plate, a light source, a light reflector, a light diffusing plate, etc. A convex component is provided to a light diffusing plate or a prism sheet. The convex component is aligned merely by latching the convex component to the cut-out (see Japanese Laid-Open Patent Application Publication No. 2000-340017, for example).

With a conventional backlight device, fitting holes for positioning and supporting optical sheets are formed in side walls of a housing. Fitting convex components are provided to at least the optical sheets adjacent to the housing. The optical sheets are thereby positioned and supported (see Japanese Laid-Open Patent Application Publication No. 2000-19512, for example).

However, with the conventional liquid crystal modules, there is a limit to the height of the protrusions formed on the edge frame parts of the frame, and the protrusions can not be formed very tall. Thus, the protrusions readily come out of the holes in the light reflecting sheet. As a result, the light reflecting sheet becomes misaligned. Consequently, when the protrusions are fitted into the holes, double-sided tape or the like is used to affix the end edge parts of the light reflecting sheet to the edge frame parts of the frame so that the protrusions do not come out of the holes. This affixing entails extra work as well as the cost of the tape. Thus, assembly work becomes less efficient and the manufacturing cost becomes higher.

With the liquid crystal module of Japanese Laid-Open Patent Application Publication No. 2001-91947, the second prong part of the optical sheet is prone to coming out of the recess in the frame. With the lighting device of Japanese Laid-Open Patent Application Publication No. 2000-340017, the convex component of the light diffusing plate, etc., is prone to coming out of the cut-out in the frame. Thus, the above-mentioned problems are difficult to solve even when the positioning means are employed.

In contrast, with the backlight device of Japanese Laid-Open Patent Application Publication No. 2000-19512, because the optical sheets are positioned and supported by fitting the fitting convex components of the optical sheets from an inside into the fitting holes in the side walls of the housing, the optical sheets do not readily come out. However, with a means such as this for positioning and supporting optical sheets, because the fitting convex components readily come out of the fitting holes when the optical sheets are flexed or bent. Thus, this is unsuitable for positioning and supporting light reflecting sheet bent into a concave shape.

In view of the above, it will be apparent to those skilled in the art from this disclosure that there exists a need for an improved liquid crystal module. This invention addresses this need in the art as well as other needs, which will become apparent to those skilled in the art from this disclosure.

SUMMARY OF THE INVENTION

The present invention is conceived in light of the above-mentioned problems. One object of the present invention is to provide a liquid crystal module with which a light reflecting sheet can be accurately positioned and quickly tacked to a frame.

In accordance with one aspect of the present invention, a liquid crystal module includes a frame, a light reflecting sheet, a cold cathode tube, an optical sheet, a liquid crystal panel and a bezel. The frame has a pair of opposing edge frame parts formed on a pair of opposing side plates of the frame, respectively. At least one of the edge frame parts has an opening. The light reflecting sheet is disposed on the frame and has a pair of opposing end edge parts that is superposed on the edge frame parts of the frame, respectively. At least one of the end edge parts has a tab piece that is inserted through the opening of the at least one of the edge frame parts of the frame to engage to a lower side of the at least one of the edge frame parts. The cold cathode tube is disposed above the light reflecting sheet in an interior of the frame. The optical sheet is disposed above the cold cathode tube. The liquid crystal panel is disposed above the cold cathode tube. The bezel is disposed on a peripheral edge of the liquid crystal panel to hold down the liquid crystal panel.

With the liquid crystal module of the present invention, it is possible to provide a liquid crystal module with which a light reflecting sheet can be accurately positioned and quickly tacked to a frame.

These and other objects, features, aspects and advantages of the present invention will become apparent to those skilled in the art from the following detailed descriptions, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

A preferred embodiment of the present invention will now be explained with reference to the drawings. It will be apparent to those skilled in the art from this disclosure that the following description of the preferred embodiment of the present invention is provided for illustration only and not for the purpose of limiting the invention as defined by the appended claims and their equivalents.

Figure 1:
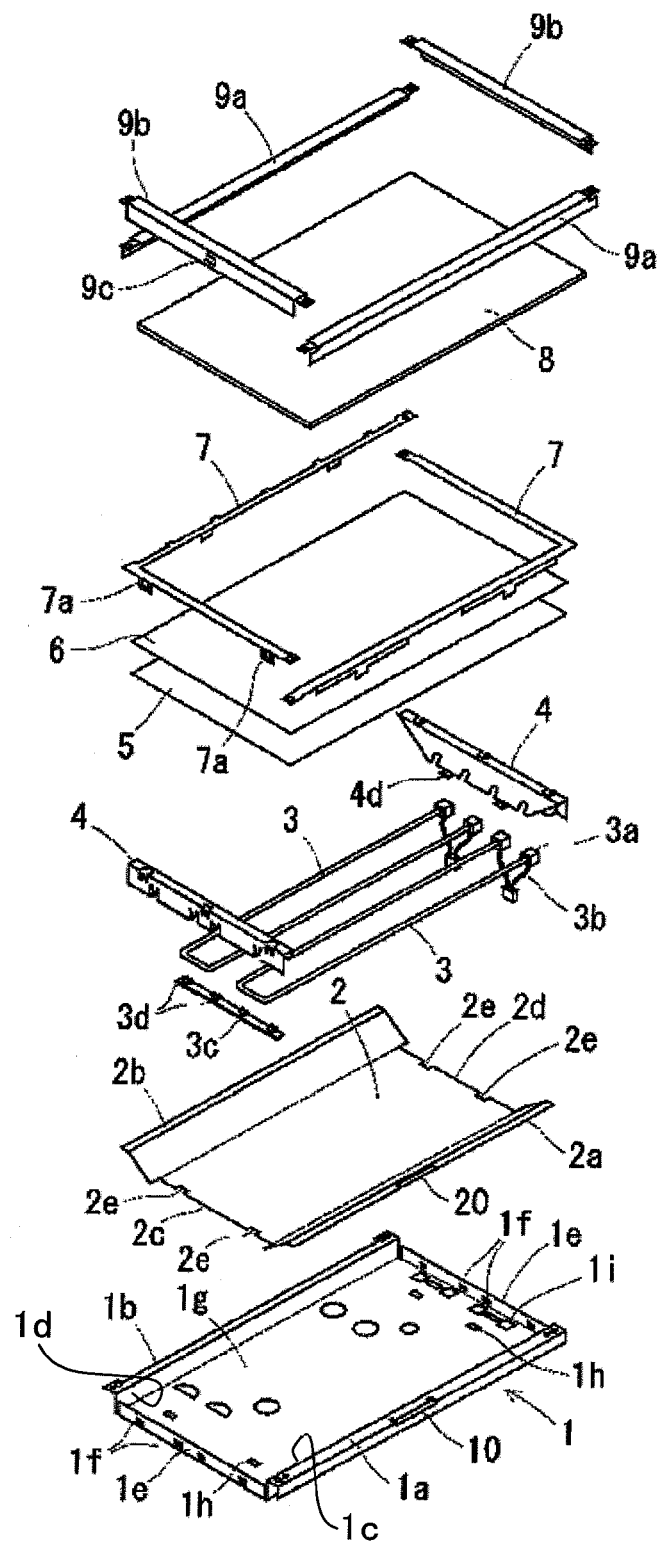
FIG. 1 is an exploded perspective view of a liquid crystal module in accordance with one embodiment of the present invention.
Figure 2:
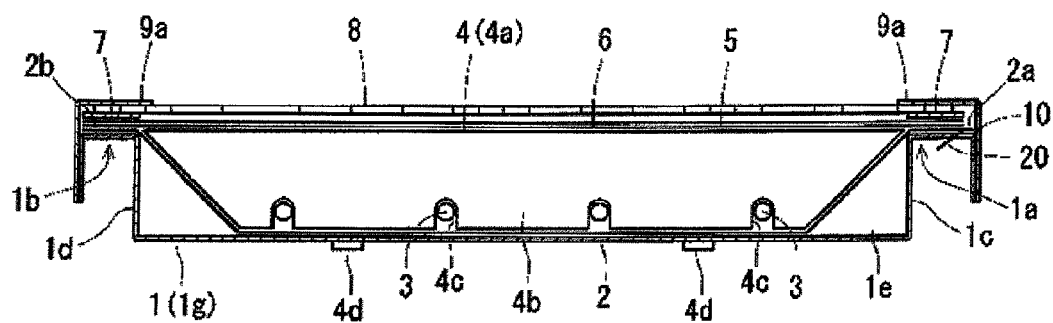
FIG. 2 is a cross sectional view of the liquid crystal module illustrated in FIG. 1.

As shown in FIGS. 1 and 2, a liquid crystal module has a frame 1, a light reflecting sheet 2, a plurality of cold cathode tubes 3, a pair of left and right lamp frames 4, a light diffusing sheet 5, a prism sheet 6, two L-shaped sheet retainer frames 7, a liquid crystal panel (liquid crystal cell) 8 and a bezel 9. The liquid crystal module is used for a personal computer or another such electronic devices. The light reflecting sheet 2 is provided to an interior of the frame 1. The cold cathode tubes 3 are disposed above the light reflecting sheet 2. The left and right lamp frames 4 are attached to the interior of the frame 1. The light diffusing sheet 5 and the prism sheet 6 are disposed one over the other as optical sheets. Peripheral edges of the light diffusing sheet 5 and the prism sheet 6 are held down by the sheet retainer frames 7. The liquid crystal panel 8 is placed over the sheet retainer frames 7. The bezel 9 fixes peripheral edges of the liquid crystal panel 8 from above. The bezel 9 includes four bezel parts (two long bezels 9a and two short bezels 9b).

As shown in FIG. 1, the frame 1 is made from sheet metal and is in the form of a flat, rectangular box. The frame 1 includes top and bottom side plates 1d and 1c, left and right side plates 1e and a base plate 1g. The top and bottom side plates 1d and 1c are formed along opposing long sides of the frame 1. The left and right side plates 1e are formed along opposing short sides of the frame 1. A pair of top and bottom opposing edge frame parts 1b and 1a is formed on the top and bottom side plates 1d and 1c, respectively. As shown in FIG. 2, the top and bottom edge frame parts 1b and 1a are formed by bending the top and bottom side plates 1d and 1c on the long sides of the frame 1 outward in an inverted U shape. A tab piece insertion opening 10 is formed in a middle part of a lengthwise direction of the bottom edge frame part 1a. The opening 10 will be discussed in detail below.

As shown in FIG. 1, four engagement holes 1f for fixing the lamp frames 4 are formed in each of the left and right side plates 1e of the frame 1. Two engagement holes 1h for fixing the lamp frames 4 are formed at locations near each of the left and right end portions of the base plate 1g. Attachment holes 1i for attaching sockets 3a of the cold cathode tubes 3 are formed in the same number (four) as the sockets 3a at the right end portion of the base plate 1g.

As shown in FIGS. 1 and 2, the light reflecting sheet 2 is a sheet bent into an inverted trapezoidal shape along a bend line. The light reflecting sheet 2 includes a pair of top and bottom end edge parts 2b and 2a on the opposing long sides. The top and bottom end edge parts 2b and 2a are placed on the top and bottom edge frame parts 1b and 1a of the frame 1, respectively. The light reflecting sheet 2 is a light-reflecting synthetic resin sheet containing a white pigment. The light reflecting sheet 2 includes a UV blocking layer for preventing degradation by UV rays formed on a surface (upper face) of the light reflecting sheet 2. The light reflecting sheet 2 is installed in the frame 1 with the UV blocking layer facing up.

The shape of another set of opposing end edge parts of the light reflecting sheet 2, that is, the shape of left and right end edge parts 2c and 2d along the left and right short sides, is asymmetrical. Specifically, as shown in FIG. 1, two concave components 2e, through which latching leg pieces 4d (discussed below) of the lamp frames 4 are passed, are formed in each of the left and right end edge parts 2c and 2d. The concave components 2e are spaced farther apart at the end edge part 2c on the left side than at the end edge part 2d on the right side, so that the shape is in left and right asymmetry. Therefore, if the positions of the left and right end edge parts 2c and 2d are switched around, it will be readily apparent that the light reflecting sheet 2 is upside-down. Thus, the light reflecting sheet 2 is reliably prevented from being attached to the frame 1 with the UV blocking layer on the surface of the light reflecting sheet 2 accidentally turned to the back.

Figure 3:
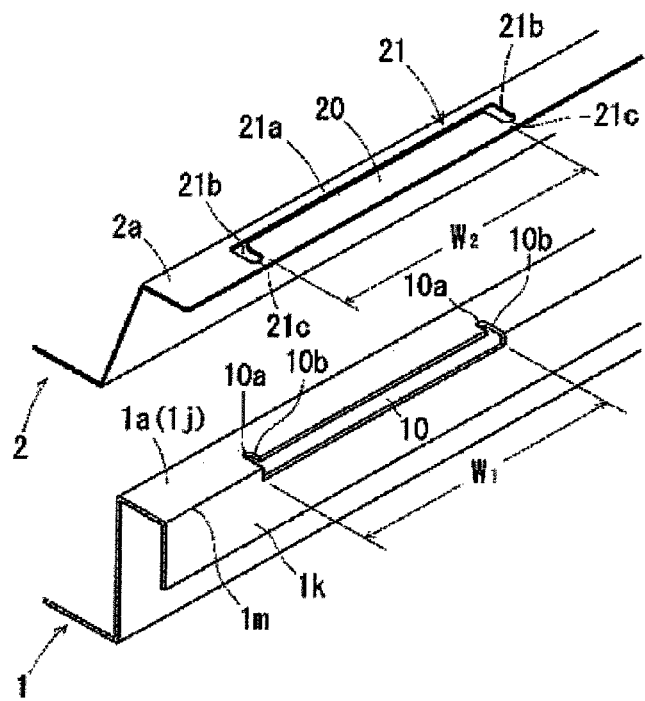
FIG. 3 is a partial perspective view of a light reflecting sheet and a frame of the liquid crystal module illustrated in FIG. 1.

The light reflecting sheet 2 further includes a tab piece 20. The tab piece 20 is formed on the bottom end edge part 2a along one long side of the light reflecting sheet 2. The tab piece 20 is disposed in a middle in the lengthwise direction of the bottom end edge part 2a. As shown in FIG. 3, the tab piece 20 extends from an outer side portion of the bottom end edge part 2a in a flat, U-shaped cut-out 21. The U-shaped cut-out 21 includes a long cut-out (e.g., long cut-out portion) 21a and short cut-outs (e.g., short cut-out portion) 21b. The long cut-out 21a extends in the lengthwise direction of the bottom end edge part 2a and is located inward of the tab piece 20. The short cut-outs 21b extends outward at a right angle from both longitudinal ends of the long cut-out 21a. The tab piece 20 is formed as a wide tab piece formed on the inside of the U-shaped cut-out 21. Curves (e.g., curve portions) 21c for preventing cracking are formed at distal ends of the short cut-outs 21b.

Figure 5:
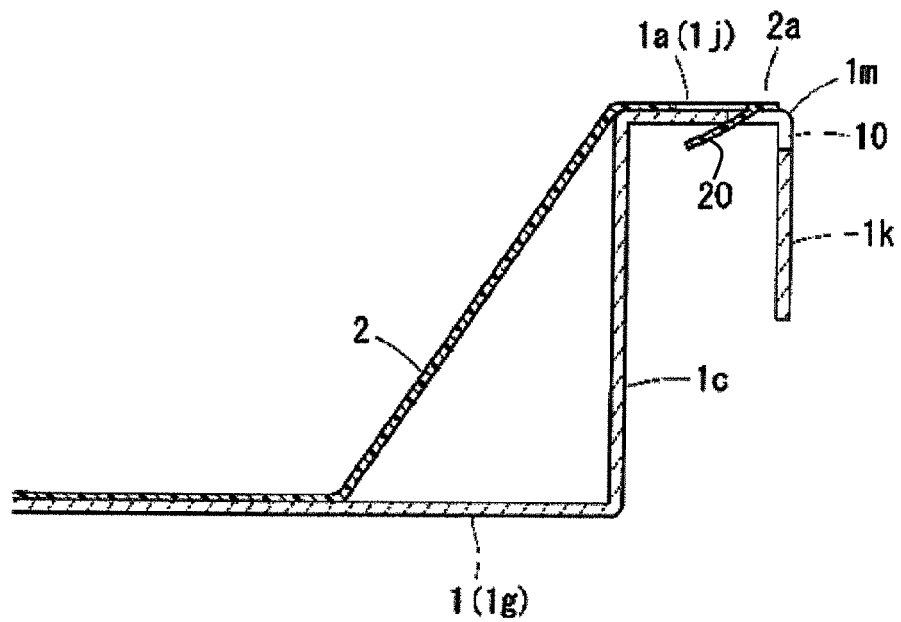
FIG. 5 is a partial cross sectional view of the light reflecting sheet and the frame of the liquid crystal module illustrated in FIG. 1.

As shown in FIGS. 1 and 3, the opening 10 in which the tab piece 20 is inserted is formed in the lengthwise direction of the bottom edge frame part 1a of the frame 1. The opening 10 is formed in a slit-like shape. The opening 10 extends between an upper plate 1j and an outer plate 1k of the bottom frame part 1a across a corner (e.g., corner portion) 1m of the upper and outer plates 1j and 1k. The opening 10 is formed by cutting out the corner 1m between the upper plate 1j and the outer plate 1k of the bottom edge frame part 1a of the frame 1 in the form of a slit as shown in FIGS. 3 and 5. The opening 10 includes cut-outs (recess sections) 10b formed inward at both longitudinal end portions of the opening 10 and curves (e.g., curve sections) 10a formed at distal ends of the cut-outs 10b. Thus, the tab piece 20 can be inserted into the opening 10 quickly and easily.

The tab piece 20 has a width W2 slightly smaller than the width W1 of the opening 10. This makes it easier to insert the tab piece 20 into the opening 10. Furthermore, there will be almost no gap between the two longitudinal ends of the tab piece 20 and the two longitudinal ends of the opening 10 in an inserted state. Thus, there will be substantially no attachment looseness of the light reflecting sheet 2, and positioning accuracy will be higher.

Figure 4:
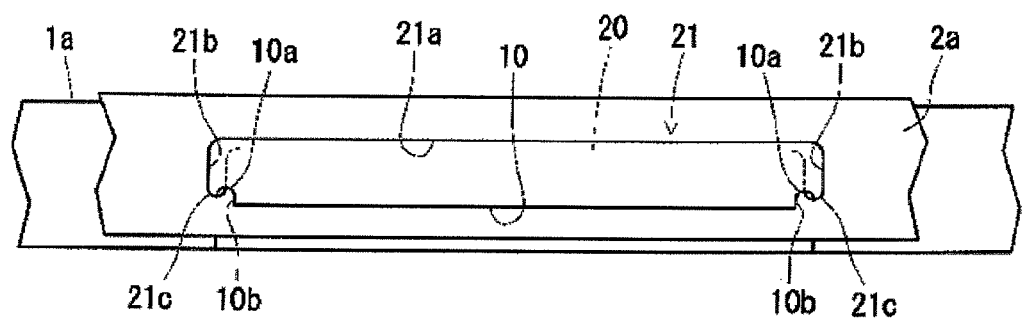
FIG. 4 is a partial front elevational view of the light reflecting sheet and the frame of the liquid crystal module illustrated in FIG. 1.

The light reflecting sheet 2 is tacked in place as follows. The top and bottom end edge parts 2b and 2a are superposed over the top and bottom edge frame parts 1b and 1a of the frame 1. As shown in FIGS. 4 and 5, the tab piece 20 of the bottom end edge part 2a of the light reflecting sheet 2 is inserted and engaged through the opening 10 of the bottom edge frame part 1a of the frame 1 to a lower side of the upper plate 1j of the bottom edge frame part 1a. Once the light reflecting sheet 2 has thus been tacked to the frame 1, the movement of the light reflecting sheet 2 to the left and right (movement in the lengthwise direction of the bottom end edge part 2a) is restricted by the tab piece 20 engaged with the opening 10. This positions the light reflecting sheet 2. In particular, positioning accuracy is good with the liquid crystal module because the width W2 of the tab piece 20 is set to be slightly smaller than the width W1 of the opening 10. Thus, there is substantially no attachment looseness of the light reflecting sheet 2.

Even if an external force is exerted that would lift up the light reflecting sheet 2, as shown in FIG. 5, the tab piece 20 will hook onto the upper plate 1j of the bottom edge frame part 1a from below, and restrict the lifting of the light reflecting sheet 2. Thus, the tab piece 20 will not come out through the opening 10. Thus, the light reflecting sheet 2 can be accurately positioned and the tacked state can be maintained until a final fixing of the light reflecting sheet 2. Therefore, there is no need for the extra work of affixing the top and bottom end edge parts 2b and 2a of the light reflecting sheet 2 with double-sided tape or the like to the top and bottom edge frame part 1b and 1a of the frame 1. Thus, the assembly becomes more efficient and the manufacturing costs can be reduced. In particular, the tab piece 20 is a wide tab piece. Thus, the tab piece 20 will prevent the light reflecting sheet 2 from lifting better than a narrower tab piece. Therefore, the tacking of the light reflecting sheet 2 will be even better.

As shown in FIG. 5, the tab piece 20 is inserted and engaged through the opening 10 in the inward direction of the frame 1 along a lower face of the upper plate 1j of the bottom edge frame part 1a. Thus, even if the bottom end edge part 2a of the light reflecting sheet 2 is subjected to a force in the inward direction, the tab piece 20 can hook onto a lip of the opening 10 and restrict movement in the inward direction. Thus, the position of the bottom end edge part 2a of the light reflecting sheet 2 is prevented from shifting to the inside. Therefore, there is no worry that misalignment of the bottom end edge part 2a in the inward direction will change the angle of inclined faces of the light reflecting sheet 2 and adversely affect reflection of light.

Also, the opening 10 is formed by cutting out the corner 1m of the bottom edge frame part 1a of the frame 1. Thus, the job of inserting the tab piece 20 in the inward direction of the frame 1 along the lower face of the upper plate 1j of the bottom edge frame part 1a will be far easier than when an opening is formed in the upper plate 1j of the bottom edge frame part 1a. Thus, the light reflecting sheet 2 can be tacked more quickly and assembly becomes even more efficient.

When the tab piece 20 has been inserted into the opening 10, as shown in FIG. 4, the curves 21c of the short cut-outs 21b are loosely engaged with the curves 10a of the cut-outs 10b. Thus, cracks are prevented from forming at the base of the tab piece 20 where it is attached.

The cold cathode tubes 3 are disposed above the light reflecting sheet 2. Each of the cold cathode tubes 3 is bent in a U shape as shown in FIG. 1. The sockets 3a are attached to both ends of each U-shaped cold cathode tube 3. The sockets 3a are made of an insulating rubber. Cables 3b equipped with connectors are connected to the sockets 3a.

Figure 7:
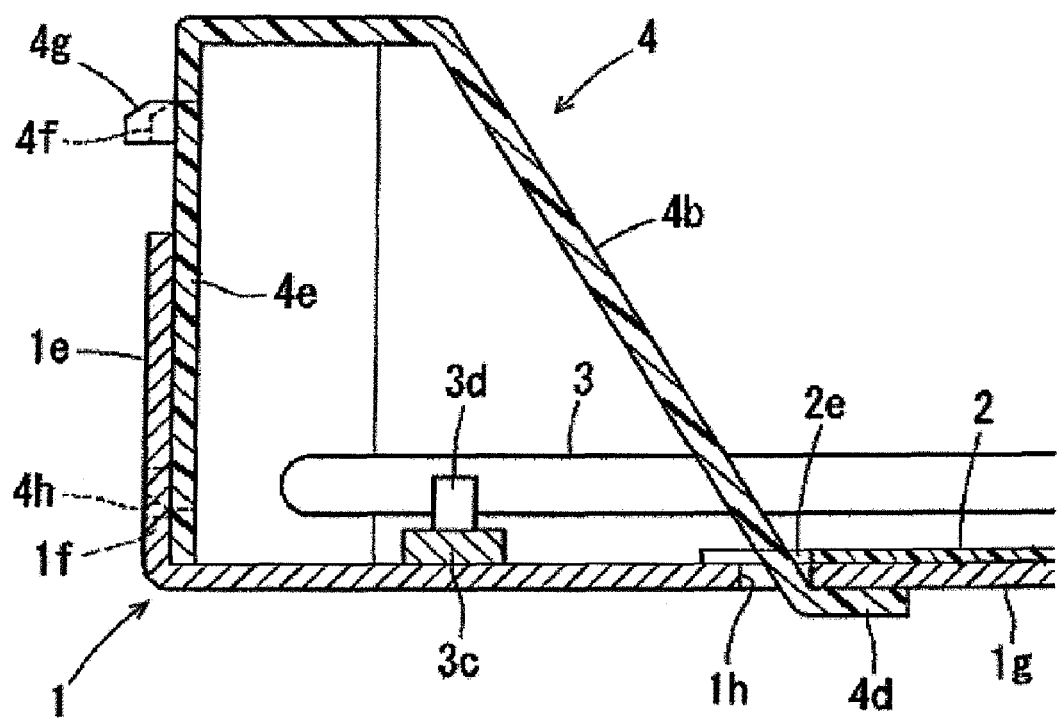
FIG. 7 is a partial cross sectional view of the liquid crystal module illustrated in FIG. 1.

The cold cathode tubes 3 are attached as follows. The sockets 3a at both ends are fitted and fixed in the attachment holes 1i of the frame 1. The connector-equipped cables 3b are taken outside through access openings formed between the attachment holes. Then, as shown in FIGS. 1 and 7, bent portions on the opposite side of the cold cathode tubes 3 are supported by supports 3d of a lamp holder 3c. The lamp holder 3c is fixed to the base plate 1g of the frame 1.

Figure 6A:
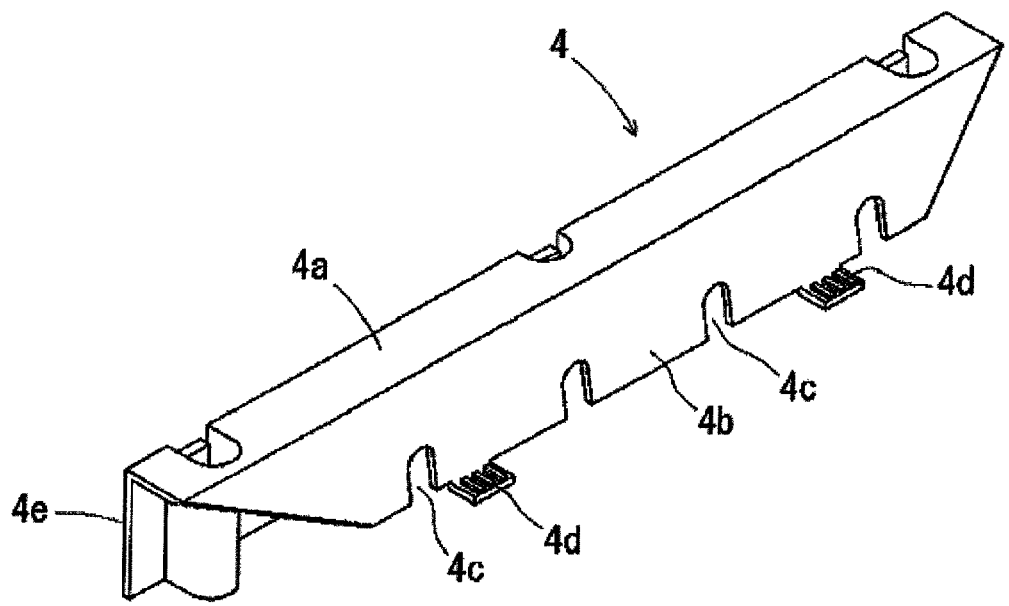
FIG. 6A is a perspective view showing a front side of a lamp frame of the liquid crystal module illustrated in FIG. 1.

The left and right lamp frames 4 are light-reflecting molded articles made by injection molding a synthetic resin containing a white pigment. The left and right lamp frames 4 cover the lamp holder 3c and the sockets 3a of the cold cathode tubes 3. Each of the left and right lamp frames 4 includes a front plate 4a, an inner side plate 4b and an outer side plate 4e. As shown in FIG. 6A, four cut-outs 4c through which the cold cathode tubes 3 are inserted are formed in a lower part of the inner side plate 4b. The inner side plate 4b angles diagonally downward from the front plate 4a. A pair of latching leg pieces 4d that protrudes inward is formed at a lower end of the inner side plate 4b. The latching leg pieces 4d are formed at positions that match up with the concave components 2e of the light reflecting sheet 2 and the engagement holes 1h of the frame 1. The spacing between the latching leg pieces 4d on one lamp frame 4 is greater than the spacing between the latching leg pieces 4d on the other lamp frame 4.

Figure 6B:
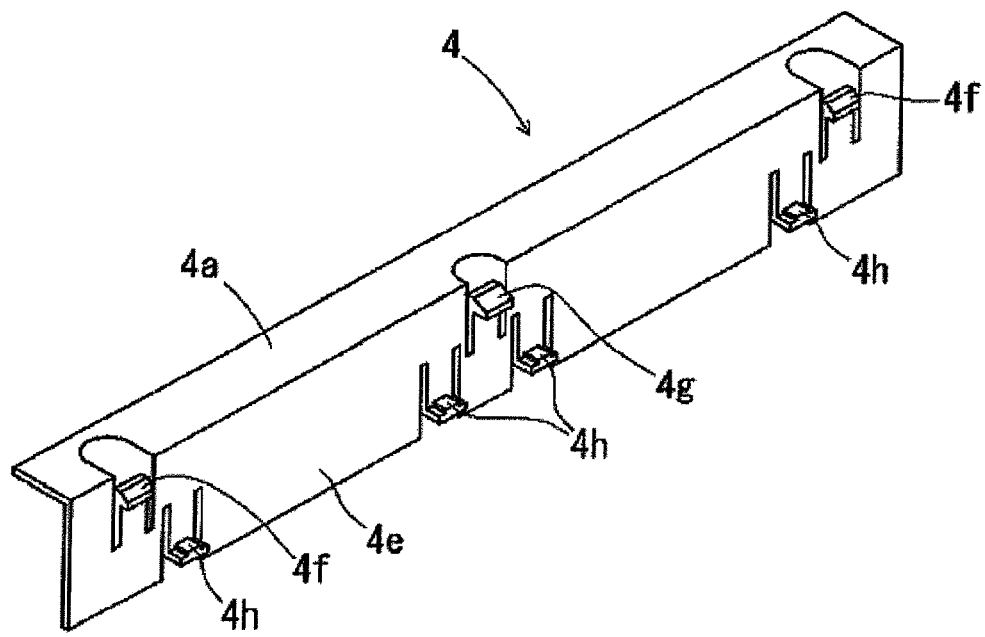
FIG. 6B is a perspective view showing a rear side of the lamp frame of the liquid crystal module illustrated in FIG. 1.
Figure 8:
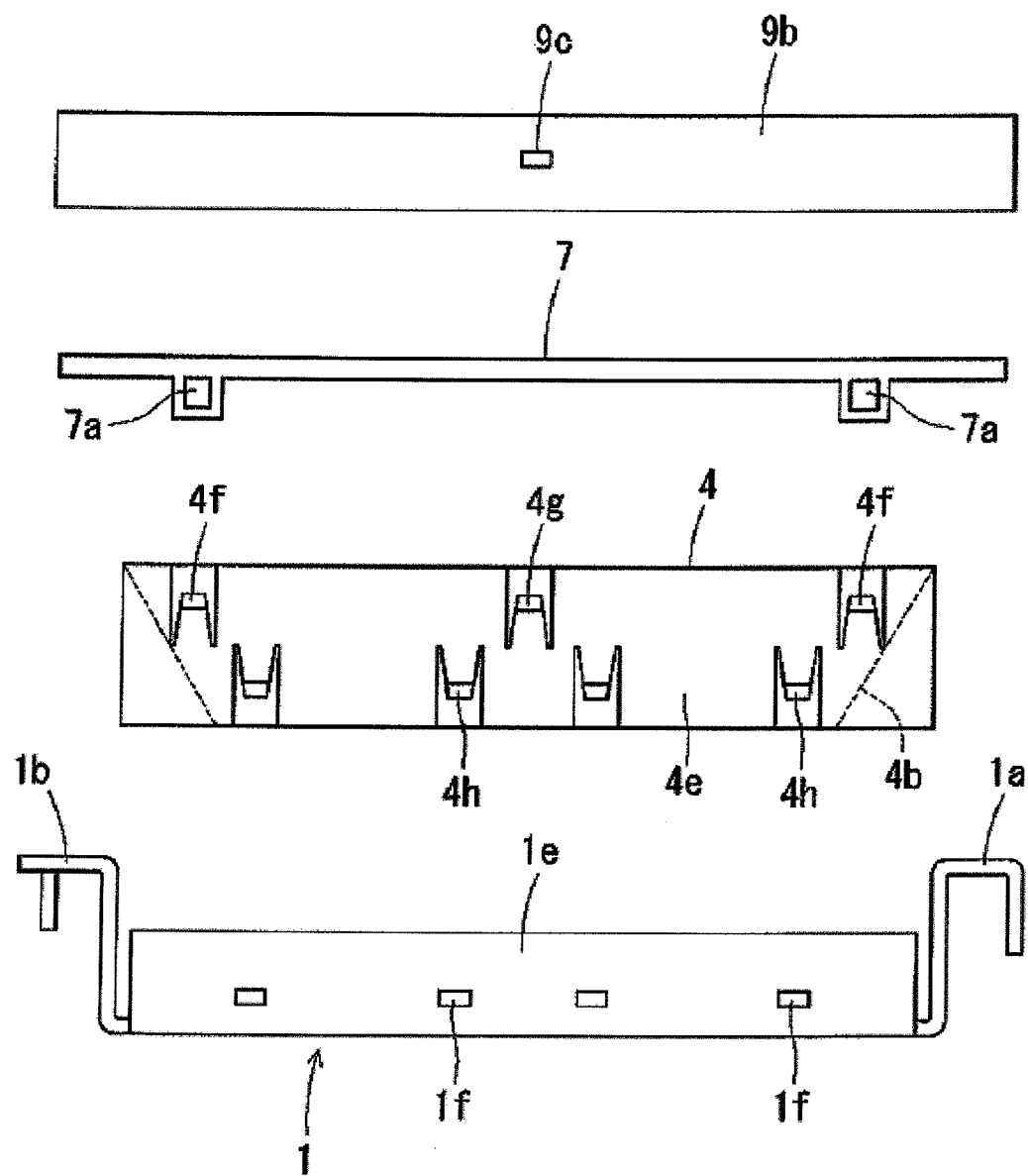
FIG. 8 is a simplified diagram illustrating an assembly of the liquid crystal module illustrated in FIG. 1.

As shown in FIGS. 6B and 8, left and right latching prong pieces 4f and a middle latching prong piece 4g are formed in a upper part of the outer side plate 4e of the lamp frame 4. The left and right latching prong pieces 4f latch downward to engagement holes 7a formed in the sheet retainer frame 7 for fixing the sheet retainer frame 7.

The middle latching prong piece 4g latches downward to a middle engagement hole 9c of the short bezel 9b for fixing the bezel 9. The latching prong piece 4g for fixing the bezel 9 protrudes farther than the latching prong pieces 4f for fixing the sheet retainer frame 7. Four latching prong pieces 4h for fixing the lamp frame 4 are formed at a lower part of the outer plate 4e. The latching prong pieces 4h are latched upward into four engagement holes 1f formed in the side plate 1e.

The lamp frames 4 are attached and fixed in the following manner. As shown in FIG. 7, the latching leg pieces 4d are passed through the concave components 2e of the light reflecting sheet 2 and inserted in the engagement holes 1h in the base plate 1g of the frame 1. The latching leg pieces 4d are latched from below to the edges of the engagement holes 1h. The elasticity of the latching prong pieces 4h of the outer side plate 4e is utilized to fit the latching prong pieces 4h into the engagement holes 1f in the side plate 1e of the frame 1. The latching prong pieces 4h are latched upward to the inner face of the engagement holes 1f. Then, attaching and fixing the lamp frames 4 to the inner side of the left and right side plates 1e of the frame 1 are completed. When the lamp frames 4 are thus attached, the left and right end edge parts 2c and 2d along the left and right short sides of the light reflecting sheet 2 are held down by the lower end of the inner side plate 4b. Thus, movement of the left and right end edge parts 2c and 2d of the light reflecting sheet 2 is restricted by the latching leg pieces 4d of the lamp frames 4 inserted in the concave components 2e of the light reflecting sheet 2. Therefore, the light reflecting sheet 2 is fixed in a state of being accurately positioned.

As shown in FIG. 2, the four peripheral edges of the light diffusing sheet 5 and the prism sheet 6 that is superposed thereover are placed over the front plates 4a of the lamp frames 4 and the top and bottom end edge parts 2b and 2a of the light reflecting sheet 2. Furthermore, the light diffusing sheet 5 and the prism sheet 6 are held down from above by the sheet retainer frames 7. The two L-shaped sheet retainer frames 7 are made of a synthetic resin and put together in a rectangular frame shape. As shown in FIGS. 1 and 8, engagement holes 7a that engage with the latching prong pieces 4f of the lamp frames 4 are formed on the short frame parts of the retainer frames 7. The latching prong pieces 4f of the lamp frames 4 are latched downward to the engagement holes 7a. As a result, attaching the sheet retainer frames 7 is completed. Furthermore, the sheet retainer frames 7 are positioned by inserting positioning pins (not shown) formed in the corner portions thereof into positioning holes in the corner portions of the frame 1.

The peripheral edges of the liquid crystal panel 8 are placed over the sheet retainer frames 7. Then, the liquid crystal panel 8 is fixed from above with the bezel 9. As a result, the assembly of the liquid crystal module is completed. The long and short bezels 9a and 9b are put together in the form of a rectangular frame and fixed at corners with screws to the frame 1. A middle part of each of the short bezels 9b can be prevented from lifting up and creating a gap by latching the latching prong pieces 4g of the lamp frames 4 downward to middle engagement holes 9c of the short bezels 9b. The long bezels 9a are attached without any gap by fixing the long bezels 9a in the middle with screws to the frame 1.

With the liquid crystal module, merely by inserting the tab piece 20 through the opening 10 to the lower side of the bottom edge frame part 1a of the frame 1, the light reflecting sheet 2 can be accurately positioned and quickly tacked to the frame 1 so that it will not come loose during assembly work. Furthermore, the light reflecting sheet 2 can be maintained in the tacked state, without becoming misaligned, until the final fixing. Thus, there is no need for the extra work of affixing the light reflecting sheet 2 with double-sided tape or the like. Therefore, assembly becomes more efficient and the manufacturing costs can be reduced.

Furthermore, with the liquid crystal module, the tab piece 20 is formed on the bottom end edge part 2a of the light reflecting sheet 2. Furthermore, the opening 10 is formed correspondingly on the bottom edge frame part 1a of the frame 1. However, the tab pieces can be formed on both of the top and bottom end edge parts 2b and 2a of the light reflecting sheet 2. Furthermore, the openings can be formed correspondingly in both of the top and bottom edge frame parts 1b and 1a of the frame 1. When the tab pieces are inserted through the openings and engaged with the side of the top and bottom edge frame parts 1b and 1a, the action and effect of the present invention will be even more pronounced.

The tab piece 20 can be formed so that the tab piece 20 extends outward from an inner side portion of the bottom end edge part 2a, and the opening 10 can be formed correspondingly at an inside corner of the upper plate 1j.

General Interpretation of Terms

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a liquid crystal module equipped with the present invention. Accordingly, these terms, as utilized to describe the present invention should be interpreted relative to a liquid crystal module equipped with the present invention as used in the normal operating position.

While a preferred embodiment has been chosen to illustrate the present invention, it will be apparent to those skilled in the art from this disclosure that various changes and modifications can be made herein without departing from the scope of the invention as defined in the appended claims. Furthermore, the foregoing description of the preferred embodiment according to the present invention is provided for illustration only, and not for the purpose of limiting the invention as defined by the appended claims and their equivalents.

What is claimed is:

1. A liquid crystal module comprising:
    a frame having a pair of opposing edge frame parts formed on a pair of opposing side plates of the frame, respectively, at least one of the edge frame parts having an opening;
    a light reflecting sheet disposed on the frame and having a pair of opposing end edge parts that is superposed on the edge frame parts of the frame, respectively, at least one of the end edge parts having a tab piece that is inserted through the opening of the at least one of the edge frame parts of the frame to engage to a lower side of the at least one of the edge frame parts;
    a cold cathode tube disposed above the light reflecting sheet in an interior of the frame;
    an optical sheet disposed above the cold cathode tube;
    a liquid crystal panel disposed above the cold cathode tube; and
    a bezel disposed on a peripheral edge of the liquid crystal panel to hold down the liquid crystal panel.

2. A liquid crystal module according to claim 1, wherein the tab piece of the light reflecting sheet has a predetermined width slightly smaller than a width of the opening of the at least one of the edge frame parts of the frame.

3. The liquid crystal module according to claim 1, wherein the tab piece of the light reflecting sheet extends inward from an outer edge portion of the at least one of the end edge parts of the light reflecting sheet.

4. The liquid crystal module according to claim 3, wherein the tab piece of the light reflecting sheet faces a part of the at least one of the end edge parts with a flat, U-shaped cut-out therebetween.

5. The liquid crystal module according to claim 4, wherein the cut-out of the light reflecting sheet has a long cut-out portion extending in a lengthwise direction of the at least one of the end edge parts and short cut-out portions extending outward and perpendicular to the long cut-out portion from both lengthwise ends of the long cut-out portion.

6. The liquid crystal module according to claim 5, wherein the opening of the frame has a slit-like shape extending in a lengthwise direction of the at least one of the edge frame parts of the frame.

7. The liquid crystal module according to claim 6, wherein the opening of the frame extends between an upper plate of the at least one of the edge frame parts and an outer plate of the at least one of the edge frame parts across a corner portion of the upper plate and the outer plates.

8. The liquid crystal module according to claim 1, wherein the opening of the frame extends between an upper plate of the at least one of the edge frame parts and an outer plate of the at least one of the edge frame parts across a corner portion of the upper plate and the outer plates.

9. The liquid crystal module according to claim 5, wherein each of the short cut-out portions of the cut-out of the light reflecting sheet has a curve portion formed at a distal end of each of the short cut-out portions, and
the opening of the frame has recess sections extending inward from both lengthwise end portions of the opening, each of the recess sections having a curve section at a distal end of each of the recess sections.

10. The liquid crystal module according to any of claim 7, wherein
each of the short cut-out portions of the cut-out of the light reflecting sheet has a curve portion formed at a distal end of each of the short cut-out portions, and
the opening of the frame has recess sections extending inward from both lengthwise end portions of the opening, each of the recess sections having a curve section at a distal end of each of the recess sections.

11. The liquid crystal module according to claim 1, wherein
another pair of opposing end edge parts of the light reflecting sheet has an asymmetrical shape.

* * * * *